(12) United States Patent
Dunlay et al.

(10) Patent No.: US 10,956,016 B1
(45) Date of Patent: Mar. 23, 2021

(54) NO LOOK TOUCHSCREEN PANEL / CDU

(71) Applicant: Rockwell Collins, Inc., Cedar Rapids, IA (US)

(72) Inventors: Angela N. Dunlay, Marion, IA (US); Steven L. Kamada, Cedar Rapids, IA (US); Joshua J. Ehlinger, Marion, IA (US); Jeremy D. Wills, Reno, NV (US); Tony Adams, Marion, IA (US); John Kassie, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/684,175

(22) Filed: Nov. 14, 2019

(51) Int. Cl.
*G06F 3/0488* (2013.01)
*G06F 3/0484* (2013.01)
*G06F 3/041* (2006.01)
*G02B 27/01* (2006.01)

(52) U.S. Cl.
CPC ......... *G06F 3/04847* (2013.01); *G02B 27/01* (2013.01); *G06F 3/04162* (2019.05); *G06F 3/04883* (2013.01)

(58) Field of Classification Search
CPC ... G02B 27/01; G02F 1/13338; G06F 3/0236; G06F 3/04162; G06F 3/04812; G06F 3/0482; G06F 3/0485; G06F 3/04847; G06F 3/04855; G06F 3/0488; G06F 3/04883; G06K 2209/01; G06K 9/6835; G01C 23/00; G01C 23/005; G09G 2380/12; H01L 27/323
See application file for complete search history.

(56) References Cited

U.S. PATENT DOCUMENTS

| | | | |
|---|---|---|---|
| 7,158,871 B1 | 1/2007 | Han et al. | |
| 8,223,088 B1* | 7/2012 | Gomez | G06F 1/163 |
| | | | 345/7 |
| 9,583,010 B1 | 2/2017 | Kolek et al. | |
| 9,652,989 B1 | 5/2017 | Myren et al. | |
| 10,000,297 B2 | 6/2018 | He et al. | |
| 10,388,171 B2 | 8/2019 | Liberman et al. | |
| 2003/0069687 A1* | 4/2003 | Tsuyuki | G01C 21/34 |
| | | | 701/400 |
| 2008/0210474 A1 | 9/2008 | Lai et al. | |
| 2011/0040547 A1* | 2/2011 | Gerber | A61N 1/37235 |
| | | | 703/11 |
| 2011/0169928 A1* | 7/2011 | Gassel | H04N 13/344 |
| | | | 13/344 |

(Continued)

FOREIGN PATENT DOCUMENTS

DE 102011113600 A1 3/2013
EP 3404525 A1 11/2018
(Continued)

*Primary Examiner* — Michael J Eurice
(74) *Attorney, Agent, or Firm* — Suiter Swantz pc llo (57) ABSTRACT

A computer system in an aircraft cockpit includes a touch sensitive input device with symbology replicated at a predetermined location of a heads-up display. The touch input symbology is generally organized for input selection via directional movement; and the system orients the input origin point based on the first point of contact for each new input. The system is adapted for written text recognition with the written text and recognized letters replicated on the heads-up display at a predetermined location.

14 Claims, 11 Drawing Sheets

(56) References Cited

U.S. PATENT DOCUMENTS

| | | | | |
|---|---|---|---|---|
| 2014/0108947 A1* | 4/2014 | Chatrenet | | G06F 3/0484 |
| | | | | 715/740 |
| 2014/0361983 A1* | 12/2014 | Dolfing | | G06F 3/04883 |
| | | | | 345/156 |
| 2015/0212647 A1* | 7/2015 | Kim | | G06F 1/1643 |
| | | | | 345/173 |
| 2016/0077523 A1* | 3/2016 | Zygmant | | G08G 5/0013 |
| | | | | 701/2 |
| 2016/0147433 A1* | 5/2016 | Lin | | G06F 3/0482 |
| | | | | 715/834 |
| 2016/0253083 A1* | 9/2016 | Lee | | H04M 1/27475 |
| | | | | 715/771 |
| 2017/0024121 A1* | 1/2017 | Park | | G06F 3/04812 |
| 2017/0090693 A1* | 3/2017 | Ku | | H04N 13/207 |
| 2017/0118640 A1* | 4/2017 | Lee | | H04W 12/06 |
| 2017/0131839 A1* | 5/2017 | Zhang | | G06F 3/1454 |
| 2017/0138759 A1* | 5/2017 | Turner | | G08G 5/0052 |
| 2017/0139556 A1* | 5/2017 | Josephson | | G06F 3/04847 |
| 2017/0154326 A1* | 6/2017 | Jo | | H04W 64/00 |
| 2017/0269800 A1* | 9/2017 | Park | | H04W 4/14 |
| 2017/0275020 A1 | 9/2017 | Charbonnier et al. | | |
| 2017/0345420 A1* | 11/2017 | Barnett, Jr. | | G10L 15/30 |
| 2018/0164973 A1* | 6/2018 | Kim | | G06F 3/04817 |
| 2018/0170550 A1* | 6/2018 | Streckert | | H04N 21/43637 |
| 2018/0232425 A1* | 8/2018 | Das | | G06F 11/3476 |
| 2018/0273200 A1 | 9/2018 | De Villele et al. | | |
| 2018/0341400 A1* | 11/2018 | Kim | | G06F 3/03545 |
| 2019/0018498 A1* | 1/2019 | West | | G06T 19/006 |
| 2019/0061971 A1 | 2/2019 | Kim et al. | | |
| 2019/0164436 A1 | 5/2019 | Suddreth et al. | | |
| 2020/0117342 A1* | 4/2020 | Jatram | | G06K 19/07762 |

FOREIGN PATENT DOCUMENTS

| | | |
|---|---|---|
| GB | 2355055 A | 4/2001 |
| GB | 2529682 A | 3/2016 |
| KR | 20070008615 A | 1/2007 |
| WO | 2009040322 A1 | 4/2009 |
| WO | 2016074212 A1 | 5/2016 |

* cited by examiner

NO LOOK TOUCHSCREEN PANEL / CDU

BACKGROUND

Heads-up displays are intended to enhance pilot situational awareness and focus by displaying information without forcing the pilot to divert focus to look at screens disposed around the cabin. Using a touchscreen input with a heads-up display and no haptic feedback is challenging. Typing commands on a keyboard is also challenging where the pilot cannot conveniently look at the inputs. It would be advantageous for pilots to have a convenient mechanism for verifying what input the pilot is selecting or inputting without looking away from the heads-up display.

SUMMARY

In one aspect, embodiments of the inventive concepts disclosed herein are directed to a touch sensitive input device with symbology replicated at a predetermined location of a heads-up display.

In a further aspect, the touch input symbology is generally organized for input selection via directional movement. The input symbology orients the input origin point based on the first point of contact for each new input.

In a further aspect, the input system utilizing the touch sensitive input device is adapted for written text recognition with the written text and recognized letters replicated on the heads-up display at a predetermined location.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a touch sensitive input device with symbology replicated at a predetermined location of a heads-up display.

Figure 1:
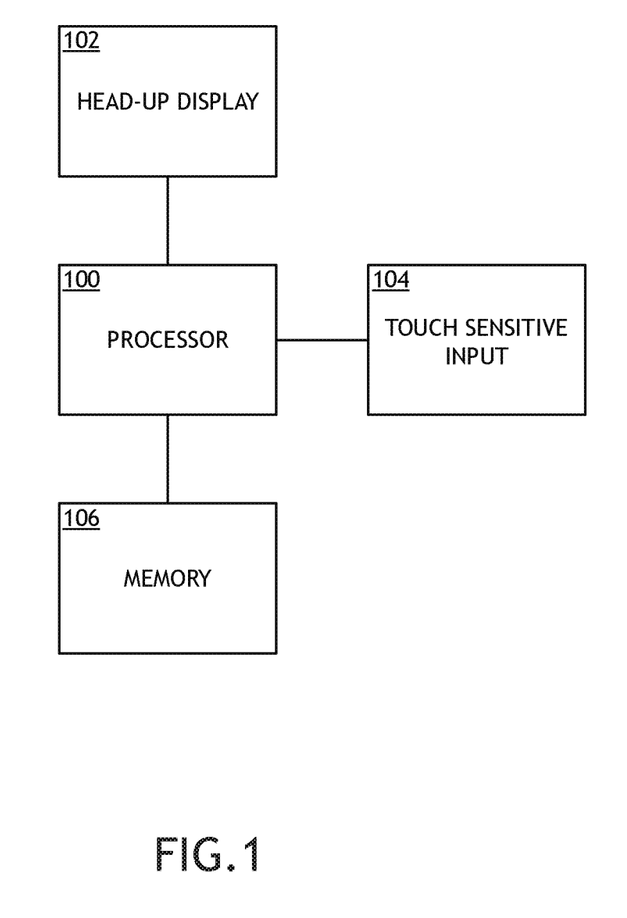
FIG. 1 shows a block diagram of a computer system for implementing an exemplary embodiment of the inventive concepts.

Referring to FIG. 1, a block diagram of a computer system for implementing an exemplary embodiment of the inventive concepts are shown. The computer system includes at least one processor 100, a heads-up display (HUD) 102 connected to the processor 100, a touch sensitive input device 104 connected to the processor 100, and a memory 106 connected to the processor for embodying processor executable code. The processor 100 may also be in data communication with avionics systems for receiving data to display on the HUD 102 and issuing instructions via the touch sensitive input device 104.

In at least one embodiment, the processor 100 is configured to render input options on the touch sensitive input device 104 (a touch sensitive screen) according to a specific symbology as further described herein. The processor 100 replicates the image rendered on the touch sensitive input device 104 at a specific location on the HUD 102; that is to say, renders a copy of the image in real-time at the specific location on the HUD 102. As elements of the symbology are manipulated via the touch sensitive input device 104, those manipulations are replicated at the specific location on the HUD 102 to allow the user to observe those manipulations without looking away from the HUD 102.

In at least one embodiment, the replicated image on the HUD 102 is rendered with reduced opacity so that underlying information is not completely obscured. Furthermore, the processor 100 may remove the replicated image from the HUD 102 when the touch sensitive input device 104 is idle for a predetermined period of time.

In at least one embodiment, the processor 100 interprets inputs to the touch sensitive input device 104 relative to an initial contact. For example, when a user touches the touch sensitive input device 104, the rendered symbology centers on that point of contact.

In at least one embodiment, inputs are hierarchically organized such that available input options generally comprise a limited set of menus, easily differentiable by relative direction from an initial contact point. Navigation is generally accomplished by drilling down through a series of menus, each re-centered after a higher-level selection.

In at least one embodiment, certain inputs instantiate a text recognition process. In such embodiments, the replicated image includes an input box for written text. Written inputs may also be centered based on an initial contact location such that as individual letters are input, subsequent letters may begin at any location on the touch sensitive input device 104. The processor 100 may normalize the locations of the written inputs in the replicated image such that the written inputs are rendered with consistent sizes and in relative proximity according to the order in which they are written.

In at least one embodiment, the processor 100 queries one or more connected avionics systems to identify system functionality and selection options. The processor 100 may then assign menu options corresponding to that system and system functionality for rendering on the touch sensitive input device 104.

Figure 2A:
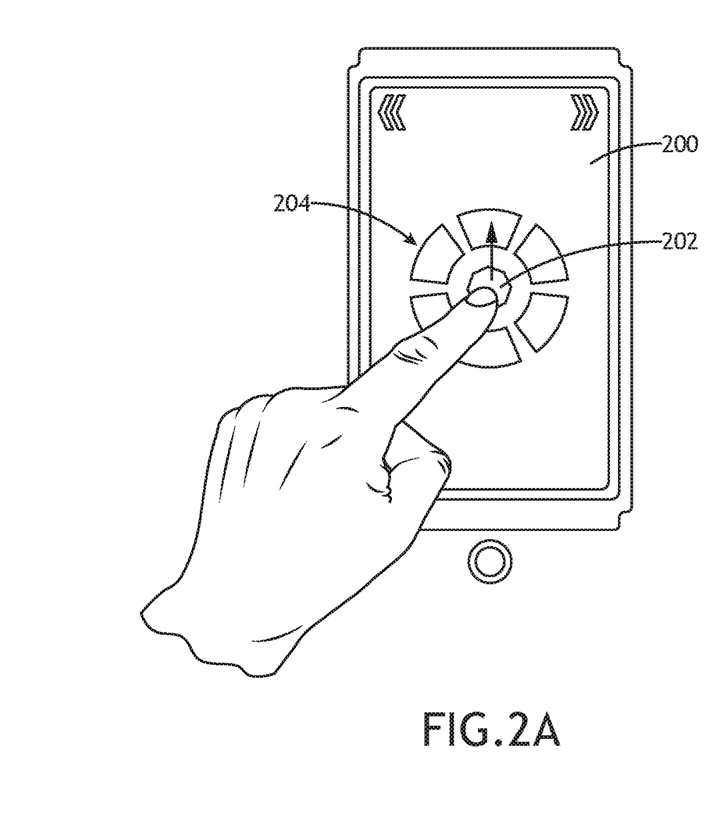
FIG. 2A shows an environmental view of a user interface according to an exemplary embodiment.
Figure 2B:
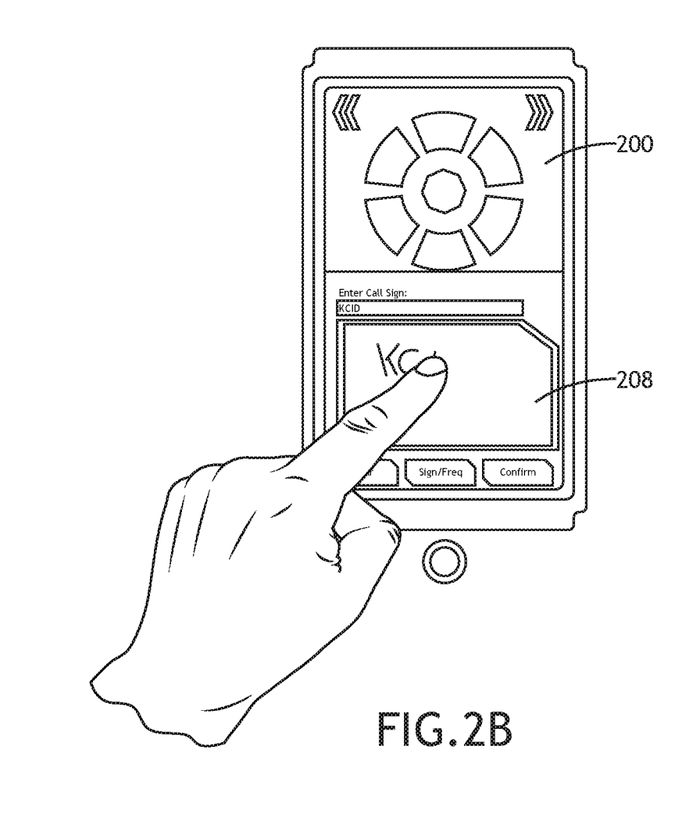
FIG. 2B shows an environmental view of a user interface according to an exemplary embodiment.

Referring to FIGS. 2A-2B, environmental views of a user interface 200 according to an exemplary embodiment are shown. The user interface 200 is configured for simplified symbology via a system of radial menus 204, 206 comprising a selection point 202 surrounded by a set of menu options, easily discernable based on relative direction from the selection point 202.

In at least one embodiment, one menu option in one or more of the radial menus 204 corresponds to a selection for text recognition. Upon selection, the radial menu 206 is moved and rendered to accommodate a written text input element 208.

Figure 3:
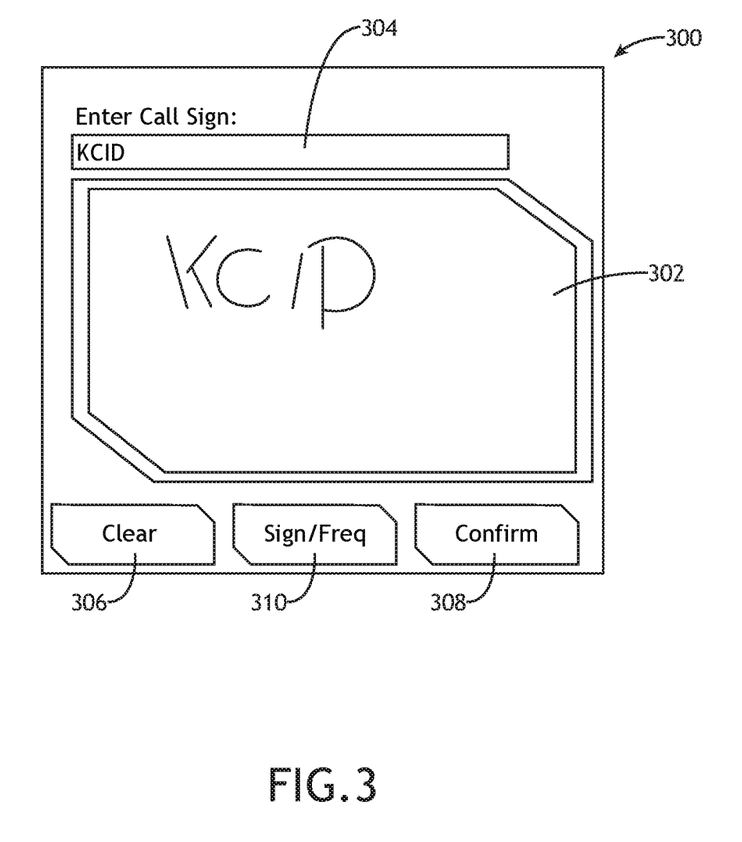
FIG. 3 shows a view of a user interface according to an exemplary embodiment such as in FIG. 2B.

Referring to FIG. 3, a view of a user interface 300 according to an exemplary embodiment such as in FIG. 2B is shown. The text input user interface 300 includes written text input element 302, a recognized text output element 304 that displays a rolling identification as written text is processed, a reset element 306 to clear the written text input element 302 and text output element 304, and a confirmation element 308 for accepting the recognized text and closing the text input user interface 300.

In at least one embodiment, where the text being input is associated with a function having several components or parameters, the text input user interface 300 may comprise a parameter selection element 310. For example, as an interface to a communication system, the user may use the written text input element 302 to enter a call sign and also allow the user to switch to a frequency selection function via the parameter selection element 310.

Figure 4A:
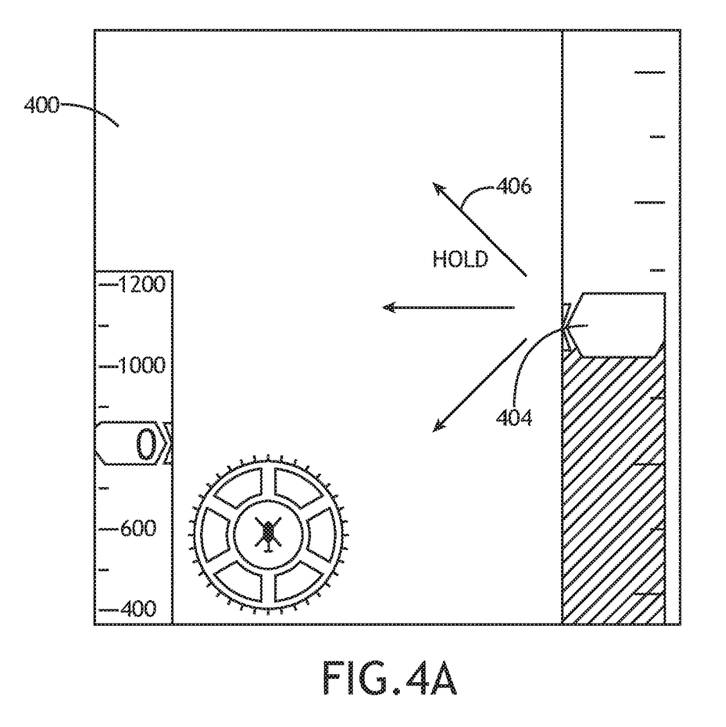
FIG. 4A shows a view of a user interface according to an exemplary embodiment.
Figure 4B:
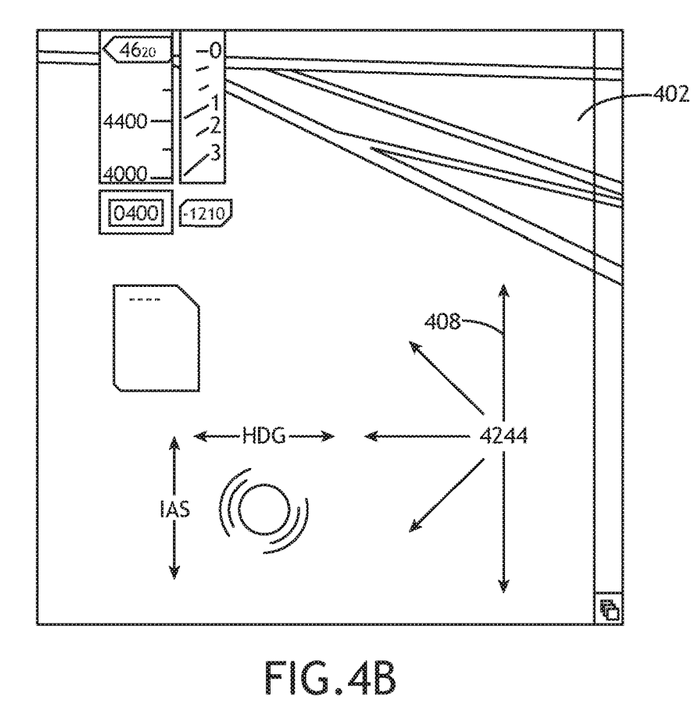
FIG. 4B shows a view of a heads-up display interface according to an exemplary embodiment.
Figure 5A:
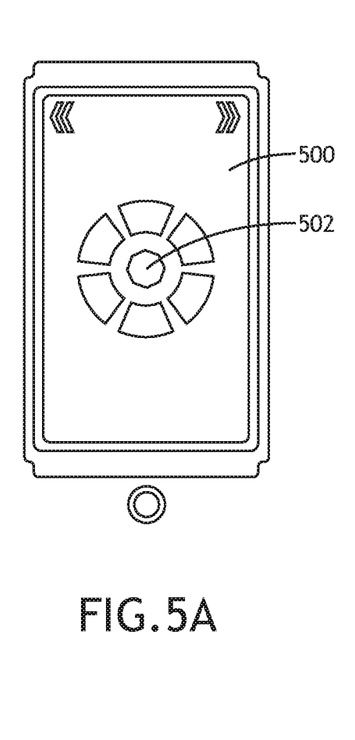
FIG. 5A shows an environmental view of a user interface according to an exemplary embodiment.
Figures 5B, 5C:
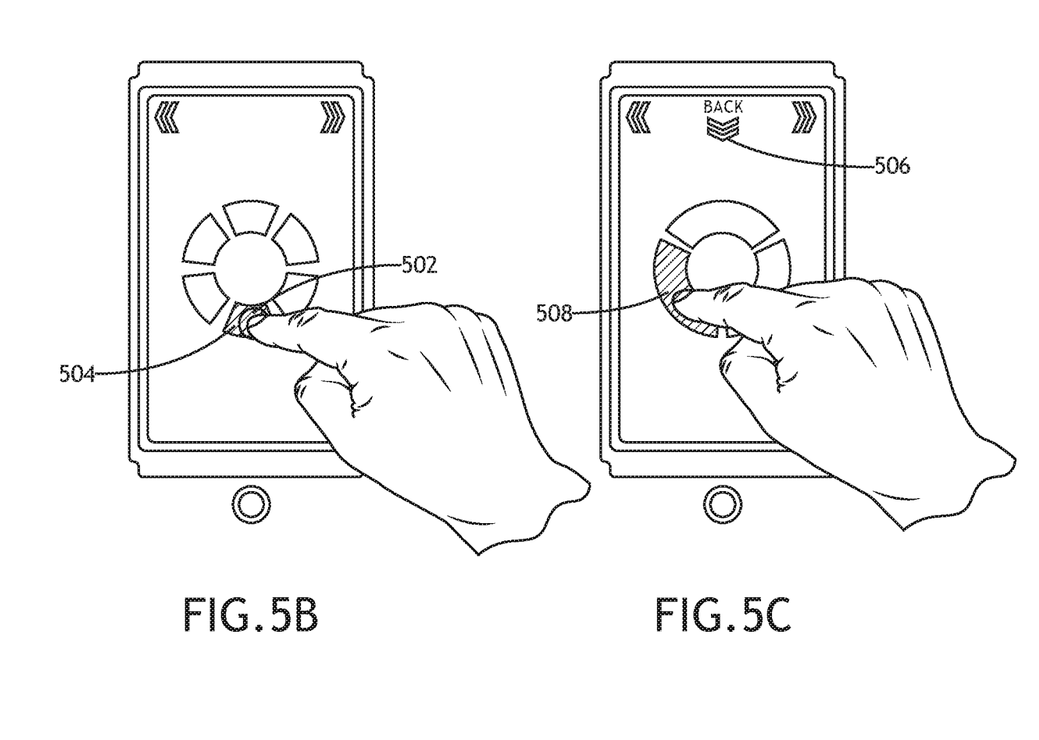
FIG. 5B shows an environmental view of a user interface according to an exemplary embodiment.
FIG. 5C shows an environmental view of a user interface according to an exemplary embodiment.
Figure 5D:
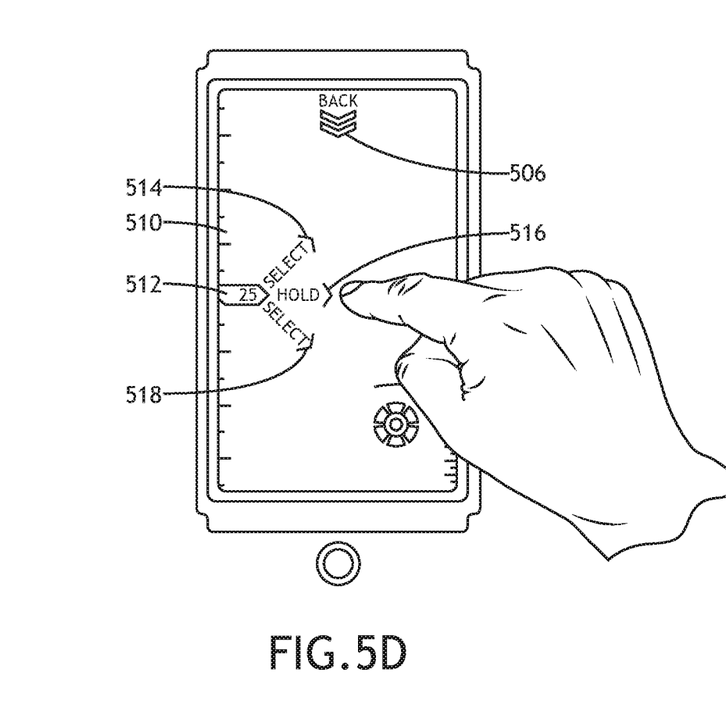
FIG. 5D shows an environmental view of a user interface according to an exemplary embodiment.
Figure 5E:
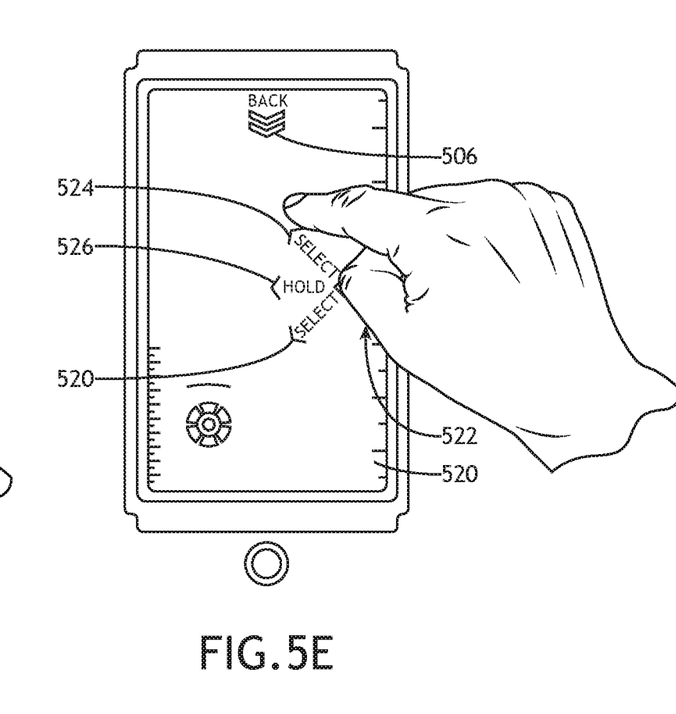
FIG. 5E shows an environmental view of a user interface according to an exemplary embodiment.
Figure 6A:
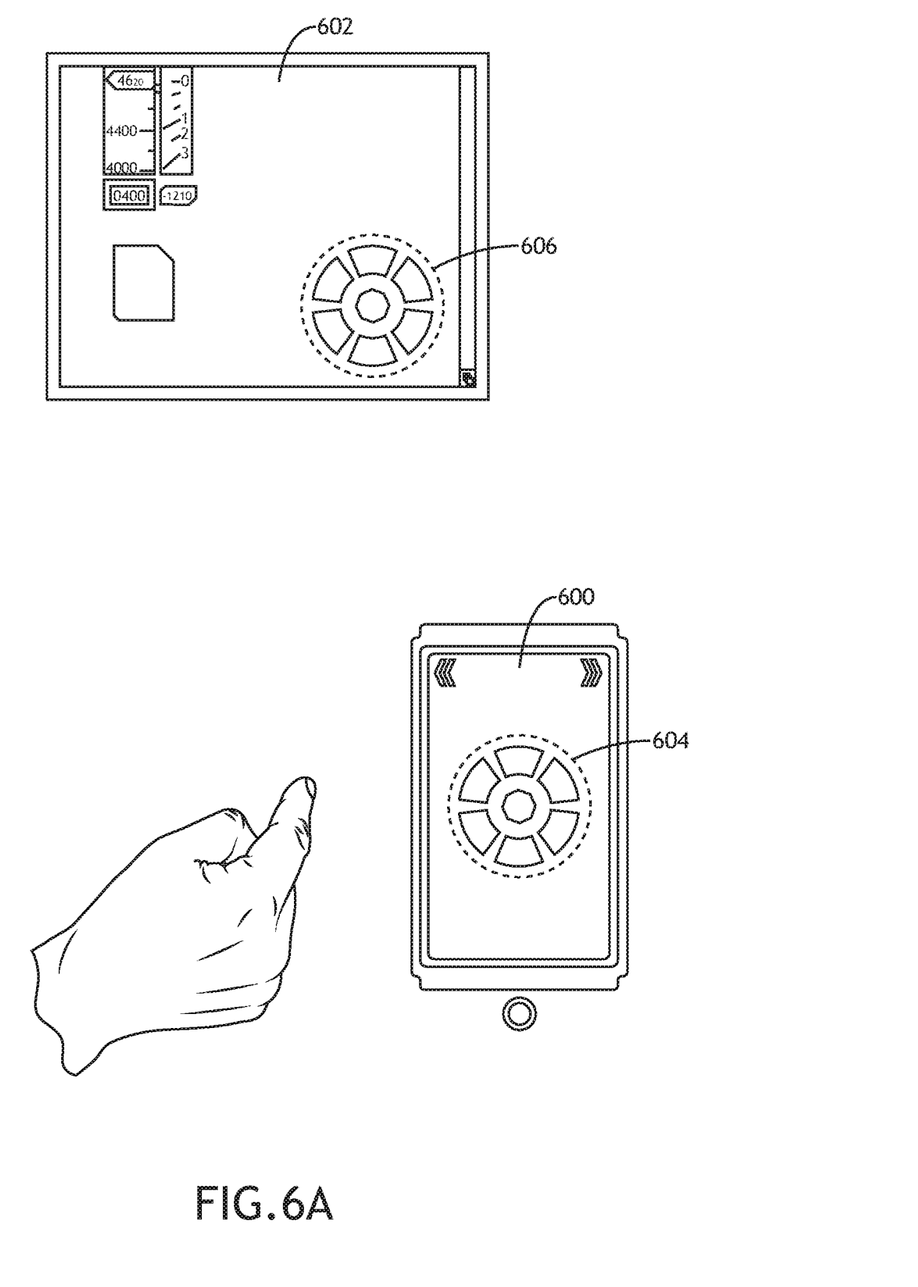
FIG. 6A shows an environmental view of a user interface and heads-up display according to an exemplary embodiment.
Figure 6B:
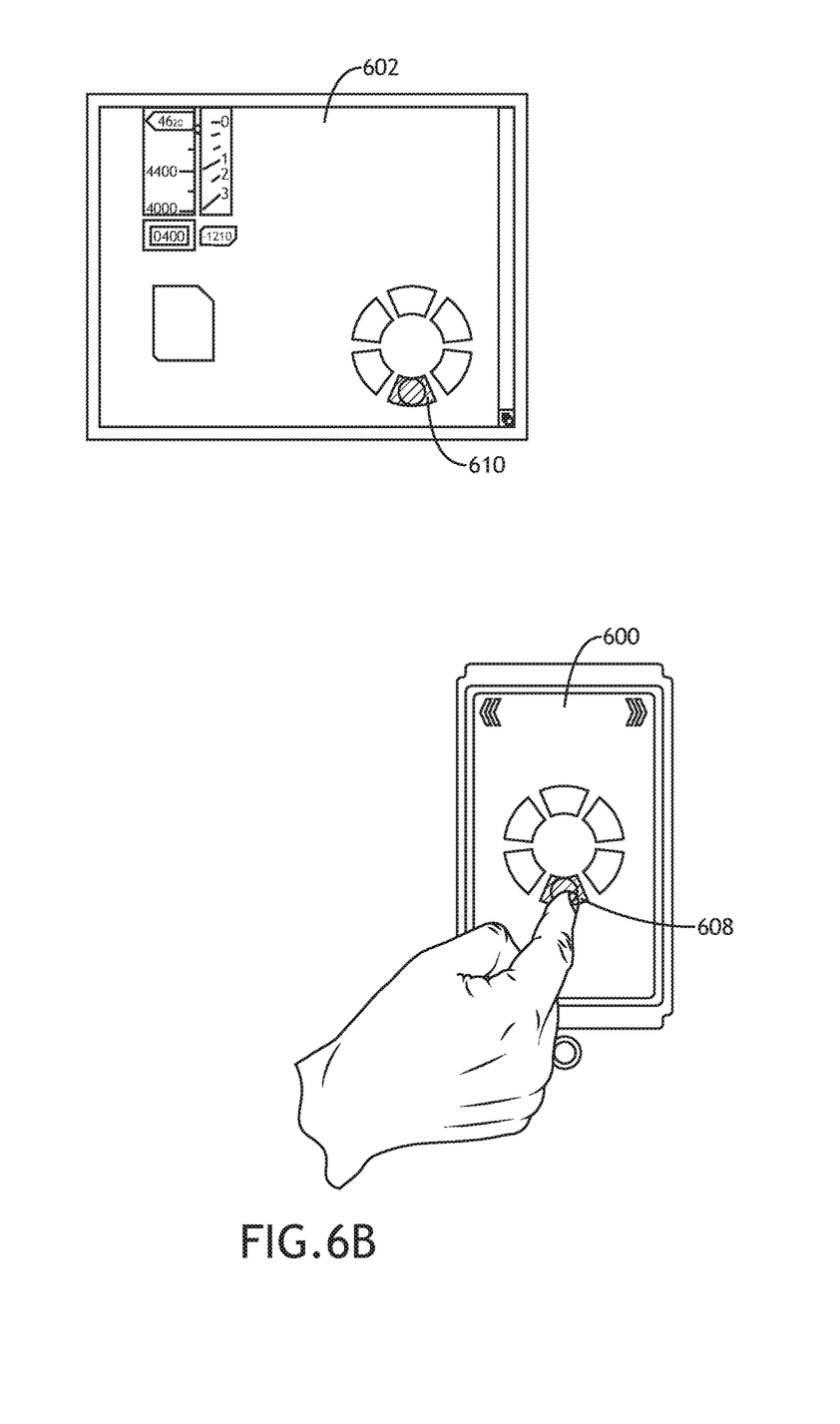
FIG. 6B shows an environmental view of a user interface and heads-up display according to an exemplary embodiment.
Figure 6C:
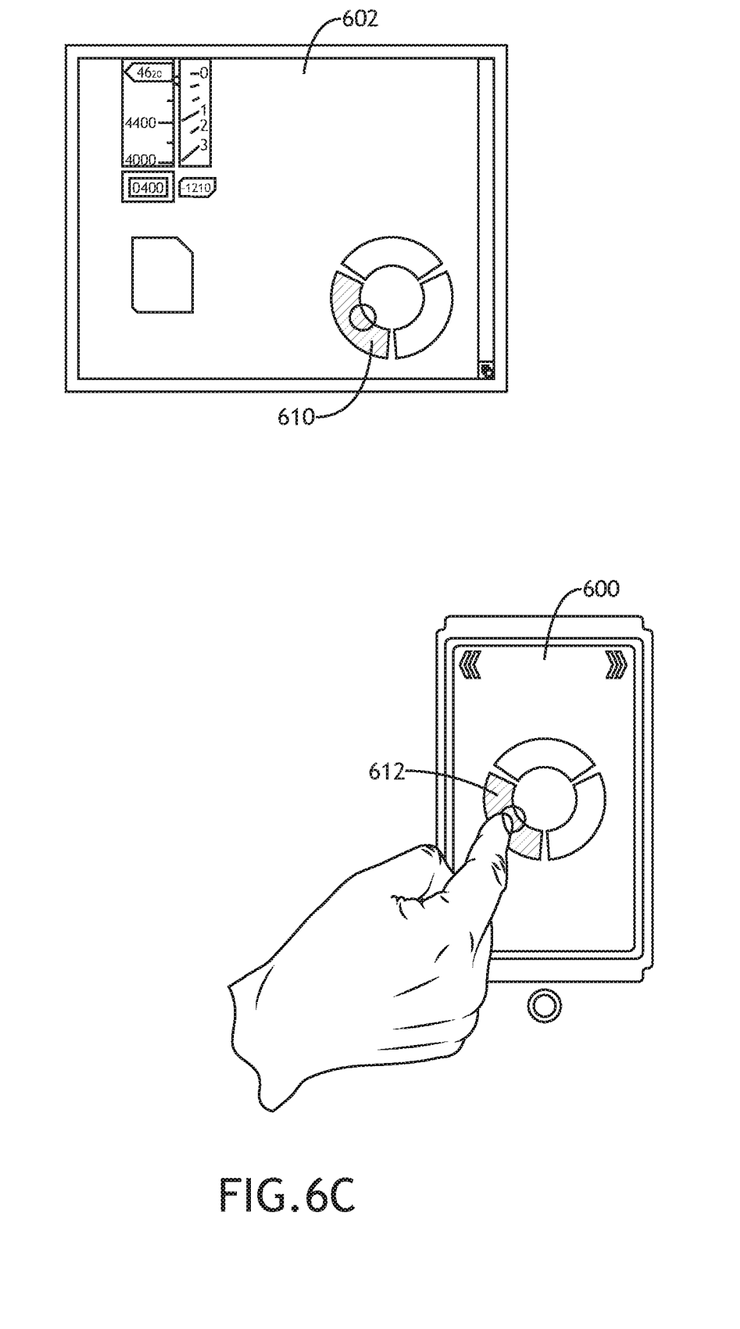
FIG. 6C shows an environmental view of a user interface and heads-up display according to an exemplary embodiment.
Figure 6D:
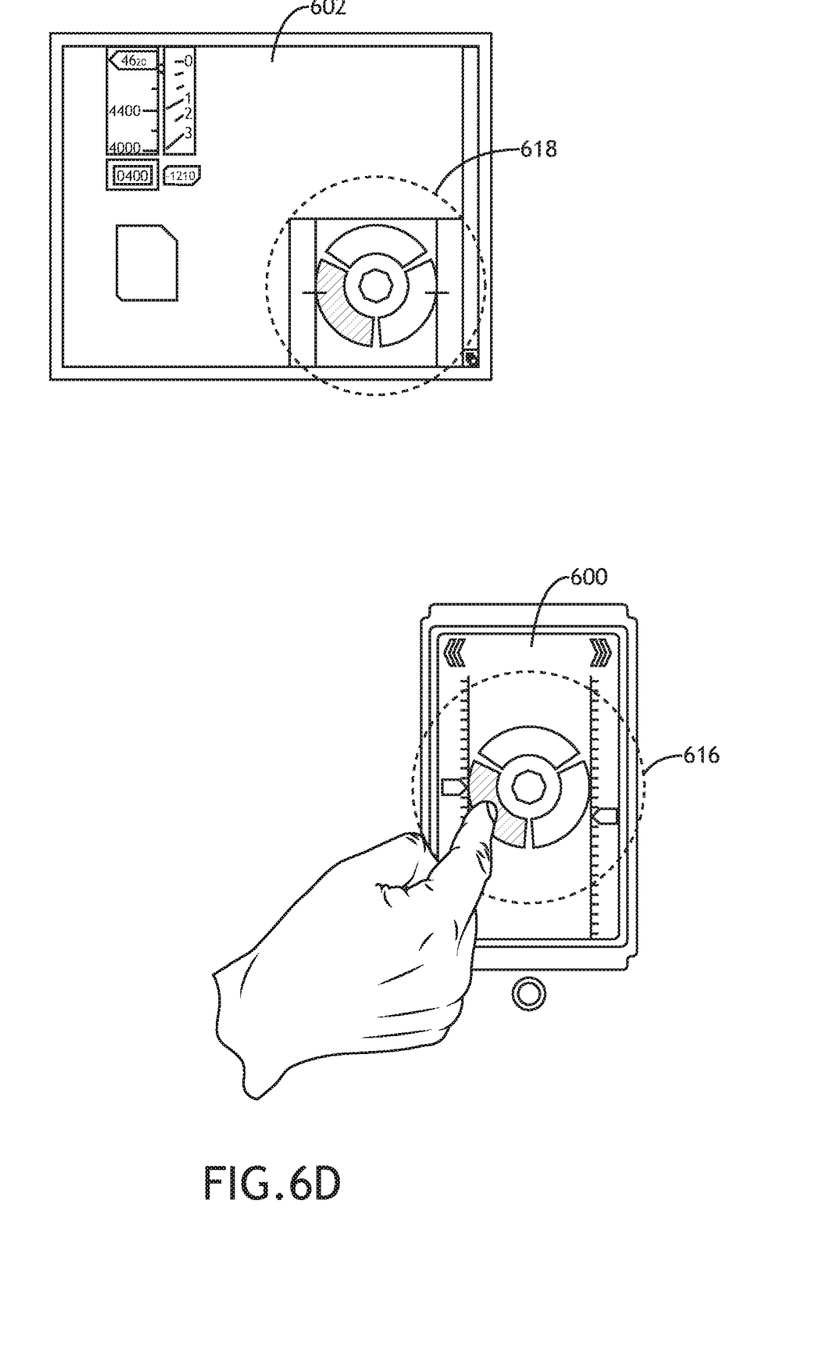
FIG. 6D shows an environmental view of a user interface and heads-up display according to an exemplary embodiment.

Referring to FIGS. 4A-4B, views of a user interface according to an exemplary embodiment are shown. A touch sensitive input device 400 renders elements for allowing a user to interact with various avionics system parameters, and replicates all of the input symbology on a HUD 402. For example, parameter values may be selected via a slider 404 and one or more directional select indicators 406. While the slider 404 and available directional select indicators 406 may be rendered along an edge of the touch sensitive input device 400, actual motion of the slider 404 and directional selections may be based on a relative gestural movement with respect to an initial point of contact, regardless of whether the initial point of contact is within the slider 404.

In at least one embodiment, actual selectin of a directional selection indicator 406 is based on a directional motion with respect to an initial point of contact, then releasing contact with the touch sensitive input device 400. After a user makes a directional motion, but before releasing contact, a processor rending the replicated input symbology on the HUD 402 may highlight the proposed selection. Such highlighting may include a textual indication of the action that will be performed upon release.

In at least one embodiment, the replicated symbology on the HUD 402 may be rendered in a further simplified or abbreviated form. For example, referring to FIGS. 4A and 4B, the slider 404 is rendered larger and with numerous graduations on the touch sensitive input device 400. By comparison, on the HUD 402, a simplified slider 408 is rendered with only a value and highlightable indicators that the user is moving the slider up or down. A simplified and scaled down representation on the HUD 402 is advantageous because, while the touch sensitive input device 400 only needs to display information necessary for making a present selection, the HUD 402 may display other information of a more immediately critical nature, and obscuring that information with an exact reproduction of the touch sensitive input device 400 may be dangerous.

Referring to FIGS. 5A-5E, environmental views of a user interface 500 according to an exemplary embodiment are shown. The touch sensitive input device 500 utilizes a series of radial menus, selectable by moving a selection point 502 in one of a limited number of easily discernable directions. Furthermore, the selection point 502, though originally rendered in a central location, may be snapped to an initial contact location whenever a user touches the touch sensitive input device 500; all of the corresponding radial menu items are also relocated to correspond to the new selection point 502 location.

In at least one embodiment, the radial menus are organized hierarchically such that selecting an initial menu element 504 from a radial menu (as in FIG. 5B) causes a new radial menu to be rendered in its place (as in FIG. 5C) with new menu elements 508 specific to the prior menu element 504. The new radial menu is also configured to re-center based on a user's initial contact location. Below the initial menu layer, a back element 506 may be included at a fixed location for returning to a higher menu layer.

In at least one embodiment, menu layers may end with a specific element for altering one or more parameters in a connected avionics system. When setting a value in a bounded range, a slider 510, 520 may be rendered with current values 512, 522 highlighted. For example, a user may select, via directional selection of increasingly granular radial menus, a representation of a primary flight display. The primary flight display may include a direction slider 510 disposed at one edge of the touch sensitive input device 500 while an altitude slider 520 is disposed on another edge of the touch sensitive input device 500.

Where two sliders 510, 520 are present, a connected processor may identify which slider 510, 520 is proximal to an initial contact location, expand that slider 510, 520 for further interaction, and reduce the other slider 510, 520 to avoid confusion or interference.

In at least one embodiment, when a slider 510, 520 is selected by proximal contact to expand for manipulation, the corresponding current value 512, 522 may be changed by directional movement up or down. At any time, directional movement away from the slider 510, 520 may cause the touch sensitive input device 500 to render additional directional options to select 514, 518, 524, 528 or hold 516, 526 the new current value 512, 522.

Referring to FIGS. 6A-6D, environmental views of a user interface 600 and HUD 502 according to an exemplary embodiment are shown. The touch sensitive input device 600 utilizes a system of radial menus 604 that are replicated 606 on the HUD 602 at a fixed location. In at least one embodiment, the replication 606 may have reduced opacity, either consistently or whenever the touch sensitive input device 600 is not being utilized. When the radial menu 604 is being manipulated, such manipulations are replicated in real-time on the HUD 602 replication 606. For example, as a user moves a selection element toward a menu item 608, those movements also appear in the replication 606 so that the user can make the desired selection, confidently, without looking away from the HUD 602.

In at least one embodiment, the radial menus 604 are centered on an initial contact location such that menu selection is always based on relative movement from that initial contact location. The replication 606 is stationary in the HUD 602 no matter where the initial contact location is on the touch sensitive input device 600.

In at least one embodiment, selections may be made or parameters adjusted via one or more sliders 616. The sliders 616 may also be replicated in a simplified for 618 to allow the user to observe the selection being made without cluttering the HUD 602.

Figure 7:
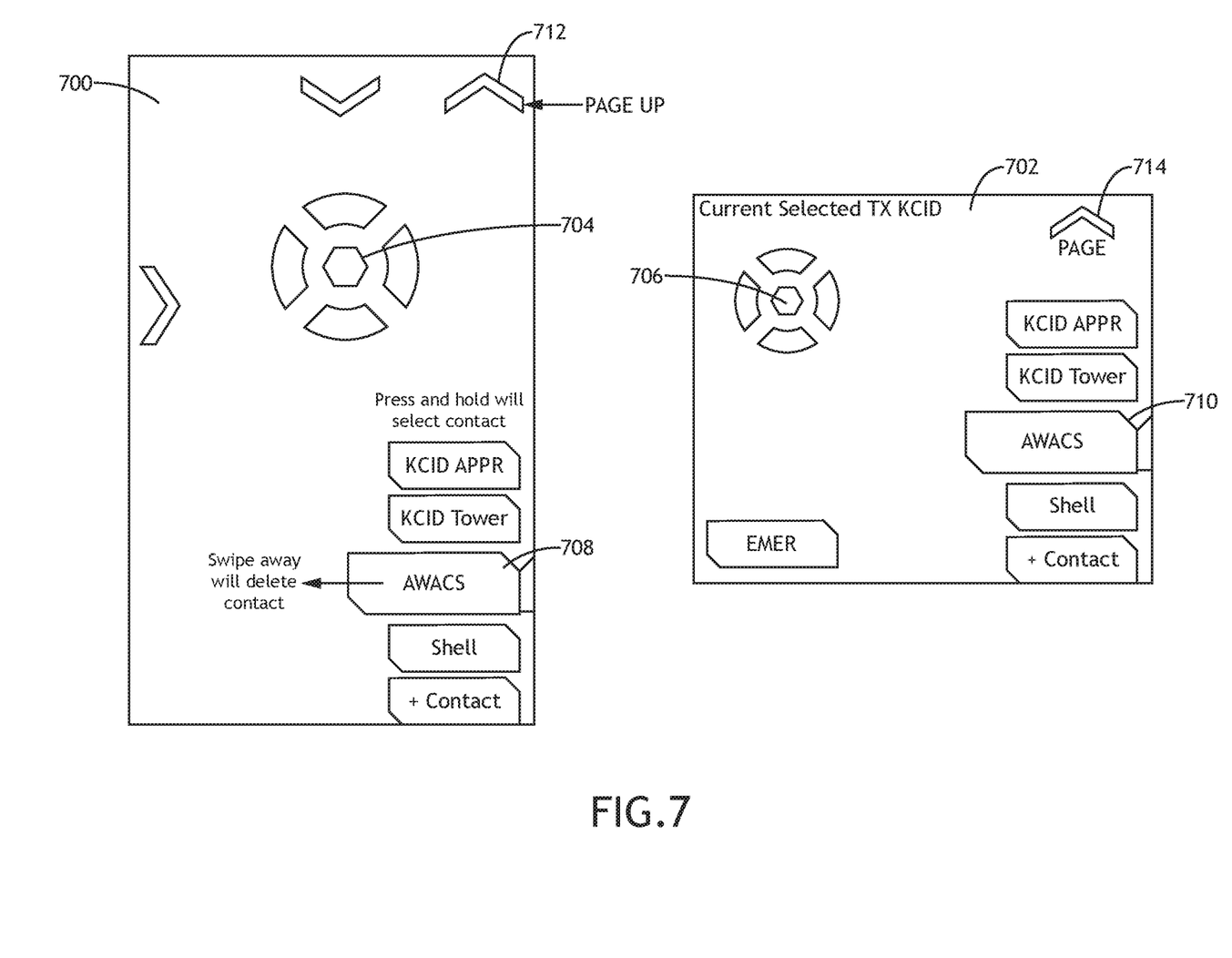
FIG. 7 shows views of a user interface and heads-up display according to an exemplary embodiment.

Referring to FIG. 7, views of a user interface 700 and HUD 702 according to an exemplary embodiment are shown. While using the touch sensitive input device 700, cognitive tunneling may the utilized to direct the user to focus on decisions necessary at each successive step of a process by minimizing or otherwise drawing focus away from certain available actions. For example, when tuning a communication system, the user may select from a list of stored contacts sliding a finger along the list; a current contact 708, 710 is highlighted by expanding the size of the contact 708, 710 both on the touch sensitive input device 700 and on a replicated input symbology on the HUD 702.

While navigating the hierarchical menu structure or proceeding through the successive process steps, it may be necessary regress to a previous step. The touch sensitive input device 700 includes a "back" element 712 for regressing though previous steps or menus. The back element 712 is also replicated 714 on the HUD 702.

In at least one embodiment, the symbology replicated on the HUD 702 is generally more condensed than on the touch sensitive input device 700. While all of the relative positional relationships are preserved, the absolute distances between elements is not as critical on the HUD 702 because, while there is a risk of a user selecting the wrong input on the touch sensitive input device 700 if those elements are too close together, the elements on the HUD 702 are purely informational; close spacing on the HUD 702 is therefore not injurious. However, because replication on the HUD 702 is intended to allow the user to know what is being selected on the touch sensitive input device 700, and make corrections, the relative placement of elements should be maintained.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
  a heads-up display (HUD);
  a touch sensitive input device; and
  at least one processor in data communication with the HUD, the touch sensitive input device, and a memory storing processor executable code for configuring the at least one processor to:
    render a radial menu on the touch sensitive input device;
    render a representation of the radial menu at a fixed location on the HUD;
    receive a directional input to the radial menu from the touch sensitive input device; and replicate the directional input on the representation on the HUD and render a textual indication of an action that will be performed by the input.

2. The computer apparatus of claim 1, wherein the processor executable code further configures the at least one processor to:
   receive an initial contact location on the touch sensitive input device; and
   translate the radial menu to center on the initial contact location.

3. The computer apparatus of claim 1, wherein the processor executable code further configures the at least one processor to:
   identify one or more input options associated with a current set of process steps;
   emphasize the one or more input options in at least the representation on the HUD to utilize cognitive tunneling to facilitate the process steps.

4. The computer apparatus of claim 1, wherein the processor executable code further configures the at least one processor to:
   render one or more sliders along corresponding edges of the touch sensitive input device when a radial menu selection requires a value input;
   render a simplified slider in the representation on the HUD corresponding to the one or more sliders;
   receive a directional input along at least one of the one or more sliders; and
   highlight a direction of the directional input on the simplified slider.

5. The computer apparatus of claim 1, wherein the processor executable code further configures the at least one processor to reducing an opacity of the representation whenever there is no input to the touch sensitive input device.

6. The computer apparatus of claim 5, wherein the processor executable code further configures the at least one processor to de-render the representation when an input to the touch sensitive input device is not received for a predefined period of time.

7. The computer apparatus of claim 1, wherein the processor executable code further configures the at least one processor to:
   render a written text input element on the touch sensitive input device;
   render an output text element and written text representation element on the HUD;
   receive a written character input in the written text element;
   render the written character in the written text representation element;
   perform text recognition on the written character; and
   output the recognized text to the output text element.

8. The computer apparatus of claim 7, wherein the processor executable code further configures the at least one processor to:
   identify an initial contact location on the written text input element;
   perform text recognition on successive characters based on the initial contact location of each character; and
   render each successive written character on the written text representation element by translating each written character based on the corresponding initial contact location to render the written characters in order regardless of where they were written on the written text input element.

9. An avionics input system in an aircraft comprising:
   a heads-up display (HUD);
   a touch sensitive input device; and
   at least one processor in data communication with the HUD, the touch sensitive input device, and a memory storing processor executable code for configuring the at least one processor to:
     render a written text input element on the touch sensitive input device;
     render an output text element comprising a text box at a defined location of the HUD and written text representation element comprising a user interface element for rendering user written input text at a defined location on the HUD;
     identify an initial contact location on the written text input element for each written character in a succession of written characters;
     receive a succession of written character inputs in the written text element;
     render the written characters in the written text representation element;
     render each successive written character on the written text representation element by translating each written character based on the corresponding initial contact location to render the written characters in order regardless of where they were written on the written text input element;
     perform text recognition on the written characters;
     output the recognized text to the output text element;
     render a radial menu on the touch sensitive input device;
     render a representation of the radial menu at a fixed location on the HUD;
     receive a directional input to the radial menu from the touch sensitive input device; and
     replicate the directional input on the representation on the HUD and render a textual indication of an action that will be performed by the input.

10. The avionics input system in an aircraft of claim 9, wherein the processor executable code further configures the at least one processor to:
    receive an initial contact location on the touch sensitive input device; and
    translate a radial menu to center on the initial contact location.

11. The avionics input system in an aircraft of claim 9, wherein the processor executable code further configures the at least one processor to:
    identify one or more input options associated with a current set of process steps;
    emphasize the one or more input options in at least the representation on the HUD to utilize cognitive tunneling to facilitate the process steps.

12. The avionics input system in an aircraft of claim 9, wherein the processor executable code further configures the at least one processor to:
    render one or more sliders along corresponding edges of the touch sensitive input device when a radial menu selection requires a value input;
    render a simplified slider in the representation on the HUD corresponding to the one or more sliders;
    receive a directional input along at least one of the one or more sliders; and
    highlight a direction of the directional input on the simplified slider.

13. The avionics input system in an aircraft of claim 9, wherein the processor executable code further configures the at least one processor to reducing an opacity of the representation whenever there is no input to the touch sensitive input device.

14. The avionics input system in an aircraft of claim 13, wherein the processor executable code further configures the at least one processor to de-render the representation when an input to the touch sensitive input device is not received for a predefined period of time.

\* \* \* \* \*